(12) United States Patent
Nikitin et al.

(10) Patent No.: US 9,996,716 B2
(45) Date of Patent: *Jun. 12, 2018

(54) MODULATION INDEX (DEPTH) BASED GROUPING, ADDRESSING, AND FINGERPRINTING RFID TAGS

(71) Applicant: INTERMEC IP CORP., Everett, WA (US)

(72) Inventors: Pavel Nikitin, Seattle, WA (US); Stephen J. Kelly, Marion, IA (US)

(73) Assignee: INTERMEC IP CORP., Lynnwood, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/665,798

(22) Filed: Aug. 1, 2017

(65) Prior Publication Data
US 2017/0357834 A1 Dec. 14, 2017

Related U.S. Application Data

(63) Continuation of application No. 14/587,772, filed on Dec. 31, 2014, now Pat. No. 9,727,763.

(51) Int. Cl.
*G06K 7/00* (2006.01)
*G06K 7/10* (2006.01)

(52) U.S. Cl.
CPC ..... *G06K 7/10227* (2013.01); *G06K 7/10039* (2013.01); *G06K 7/10108* (2013.01)

(58) Field of Classification Search
CPC .......... G06K 7/10108; G06K 7/10227; G06K 7/10039
See application file for complete search history.

(56) References Cited

U.S. PATENT DOCUMENTS

| 6,577,238 | B1 | 6/2003 | Whitesmith et al. |
| 7,468,670 | B2 | 12/2008 | Liu et al. |
| 7,548,153 | B2 | 6/2009 | Gravelle et al. |
| 7,604,178 | B2 | 10/2009 | Stewart |
| 8,113,435 | B2 | 2/2012 | Busch-Sorensen |
| 8,258,862 | B2 | 9/2012 | Matsuzaki et al. |

(Continued)

OTHER PUBLICATIONS

Maguire et al; "An Optimal Q-Algorithm for the ISO 18000-6C RFID Protocol;" IEEE Transactions on Automation Science and Engineering; Jan. 2009; vol. 6; No. 1; pp. 16-24.

(Continued)

*Primary Examiner* — Brian Miller
(74) *Attorney, Agent, or Firm* — Oliff PLC; R. Brian Drozd

(57) ABSTRACT

A method of addressing one or more RFID devices within a group of RFID devices includes transmitting a command to respond to the group at a first modulation depth. The method further includes receiving a response from a first sub-group of RFID devices in the group that have a minimum modulation depth less than or equal to the first modulation depth. The method further includes transmitting the command to respond to the group at a second modulation depth higher than the first modulation depth. The method further includes receiving a response from a second sub-group of RFID devices within the group that have a minimum modulation depth less than or equal to the second modulation depth. The method is also directed to authenticating RFIDs by comparing a measured minimum modulation depth to a known minimum modulation depth.

20 Claims, 6 Drawing Sheets

(56) References Cited

U.S. PATENT DOCUMENTS

| | | |
|---|---|---|
| 8,358,974 B2 | 1/2013 | Kunc et al. |
| 8,373,544 B2 | 2/2013 | Pitt-Pladdy |
| 8,461,967 B2 | 6/2013 | Partanen et al. |
| 8,847,735 B2 | 9/2014 | Gay et al. |
| 9,087,226 B2 | 7/2015 | Batra et al. |
| 2005/0263591 A1 | 12/2005 | Smith |
| 2007/0026825 A1 | 2/2007 | Wilson |
| 2007/0274242 A1 | 11/2007 | Lamacraft et al. |
| 2008/0290995 A1 | 11/2008 | Bruns et al. |
| 2009/0289767 A1 | 11/2009 | Tanaka |
| 2011/0163855 A1 | 7/2011 | Takeuchi |
| 2013/0241716 A1 | 9/2013 | Tsai et al. |

OTHER PUBLICATIONS

May 30, 2016 Search Report issued in European Patent Application No. 15200978.3.

MODULATION INDEX (DEPTH) BASED GROUPING, ADDRESSING, AND FINGERPRINTING RFID TAGS

CROSS-REFERENCE TO RELATED APPLICATION

This is a Continuation of application Ser. No. 14/587,772 filed Dec. 31, 2014. The disclosure of the prior application is hereby incorporated by reference herein in its entirety.

BACKGROUND

RFID tags are commonly used to identify persons or goods. RFID tags are usually designed to be compact and not require a battery. Due to these design constraints, RFID tags generally do not have sophisticated memory or processing capability. As a result, nearly all of the processing, management, and power functionality must be provided by the RFID reader. This can be overly burdensome on the reader, particularly if a large number of tags are within range of the reader, which occurs frequently in commercial applications. The reader must handle the volume of communications generated by the tags, organize and identify the tags, and send communications to specific tags. Additionally, if more than one tag responds simultaneously to a query, they will interfere with each other. For this reason, tag identification is an important reader function.

RFID readers use a method called singulation to identify specific tags within a group of tags within range. The singulation protocol or anti-collision protocol prevents tags from interfering with each other, allowing the reader to read data from each tag.

EPC Class 1, Generation 2 (Gen2 protocol) RFID devices use an algorithm similar to slotted ALOHA, called Q-algorithm for singulation. The Q-algorithm is illustrated in FIG. 1. In the Q-algorithm, a Q-parameter is created and all tags are instructed to create a random number for the counter, between 0 and $2^Q-1$. The reader then instructs each tag to respond only if its random number is zero, otherwise to decrement its random number by one for the next round. The critical part of the algorithm is initial value of Q. If Q is too large, time will be wasted while tags decrement their random numbers to zero. If it is too small, some tags may guess the same random number, will collide, and will need to be re-identified. In either case, singulation time can be long if the number of tags is very different from $2^Q$. All current approaches to determining Q are blind adaptive methods which include some initial guess of Q and its further refinement.

After singulation is finished, tags can be addressed individually (by their EPC IDs) and told to stay quiet (for this purpose, special bits called session inventory flags are used). However, these flags expire (typically, in several minutes) and reset to defaults due to discharge of internal tag capacitors.

There remains a need in the art for a reliably faster and more permanent method of identifying RFID tags.

SUMMARY

A method of addressing one or more RFID devices within a group of RFID devices includes transmitting a command to respond to the group at a first modulation depth. The method further includes receiving a response from a first sub-group of RFID devices in the group that have a minimum modulation depth less than or equal to the first modulation depth. The method further includes transmitting the command to respond to the group at a second modulation depth higher than the first modulation depth. The method further includes receiving a response from a second sub-group of RFID devices within the group that have a minimum modulation depth less than or equal to the second modulation depth.

In some embodiments, the method further includes performing singulation on the first sub-group. In some embodiments, the singulation is performed using the Q-algorithm. In some embodiments, the method further includes associating the first sub-group of RFID devices with a first category of products, and associating the second sub-group of RFID devices with a second category of products. In some embodiments, the method further includes identifying a product based on a minimum modulation depth of an RFID device associated with the product. In some embodiments, the method further includes placing one of the first sub-group of RFID devices in a first location, placing one of the second sub-group of RFID devices in a second location, and identifying the first or second location based on a minimum modulation depth of the RFID device at that location.

An RFID system includes a first group of RFID devices having a first minimum modulation depth. The system further includes a second group of RFID devices having a second minimum modulation depth higher than the first minimum modulation depth. The system further includes an RFID communicator having a transmitter that transmits signals to the RFID devices. The RFID communicator further includes a controller that uses the transmitter to send a first signal to the RFID devices at a first modulation depth, and send a second signal to the RFID devices at a second modulation depth. The first modulation depth is greater than or equal to the first minimum modulation depth and less than the second minimum modulation depth. The second modulation depth is greater than or equal to the second minimum modulation depth. The first group of RFID devices respond to the first and second signals. The second group of RFID devices respond to the second signal and do not respond to the first signal.

In some embodiments, the controller singulates the first group of RFID devices. In some embodiments, the controller uses the Q-algorithm to singulate the first group of RFID devices. In some embodiments, the RFID communicator further includes a receiver that receives signals from the RFID devices. In some embodiments, the controller demodulates signals received with the receiver. In some embodiments, the signals are amplitude modulated. In some embodiments, the system further includes an RFID device with a minimum modulation depth that is stored in the controller. In some embodiments, the minimum modulation depth of at least one of the groups of RFID devices is between 39% and 54%. In some embodiments, the signals have a carrier frequency between 30 and 300 KHz. In some embodiments, the signals have a carrier frequency between 30 KHz and 300 KHz. In some embodiments, the signals have a carrier frequency between 3 and 30 MHz. In some embodiments, the signals have a carrier frequency between 300 MHz and 3 GHz.

A method of authenticating an RFID identification includes transmitting a command to respond to an RFID device installed on the RFID identification at a first modulation depth. The method further includes repeating the following steps until a response is received from the RFID device to determine a measured minimum modulation depth of the RFID identification: determining if a response is received from the RFID device; and transmitting a command to respond to the RFID device at an incrementally higher modulation depth. The method further includes receiving identifying information from the RFID device. The method further includes obtaining a known minimum modulation depth of the RFID identification using the identifying information. The method further includes comparing the measured minimum modulation depth to the known minimum modulation depth. The method further includes determining that the RFID identification is not authentic if the measured minimum modulation depth is sufficiently different from the known minimum modulation depth.

In some embodiments, the first modulation depth is a value known to be lower than the minimum modulation depth of all RFID identifications. In some embodiments, the identification is a box label. In some embodiments, the identification is a personal photograph identification.

DETAILED DESCRIPTION OF THE EMBODIMENTS

Many wireless transmitters, including RFID systems, use signal modulation to transmit information. A modulated signal includes a carrier wave and a signal wave. The carrier wave is generally a predictable repeating wave. The signal wave is added to the carrier wave, which alters the carrier wave from its normal characteristics. This combined wave is transmitted wirelessly and received by a receiver. The receiver is configured to receive the carrier wave and subtracts the carrier wave from the signal wave (demodulating the signal). The receiver can thereby read the information contained in the signal wave. Modulation may include amplitude modulation, frequency modulation, phase modulation, etc. . . . . In the examples given herein, amplitude modulation is used. In the amplitude modulation example, the combined wave envelope is the signal wave, so the receiver uses an envelope detector to demodulate the combined wave.

Figure 1:
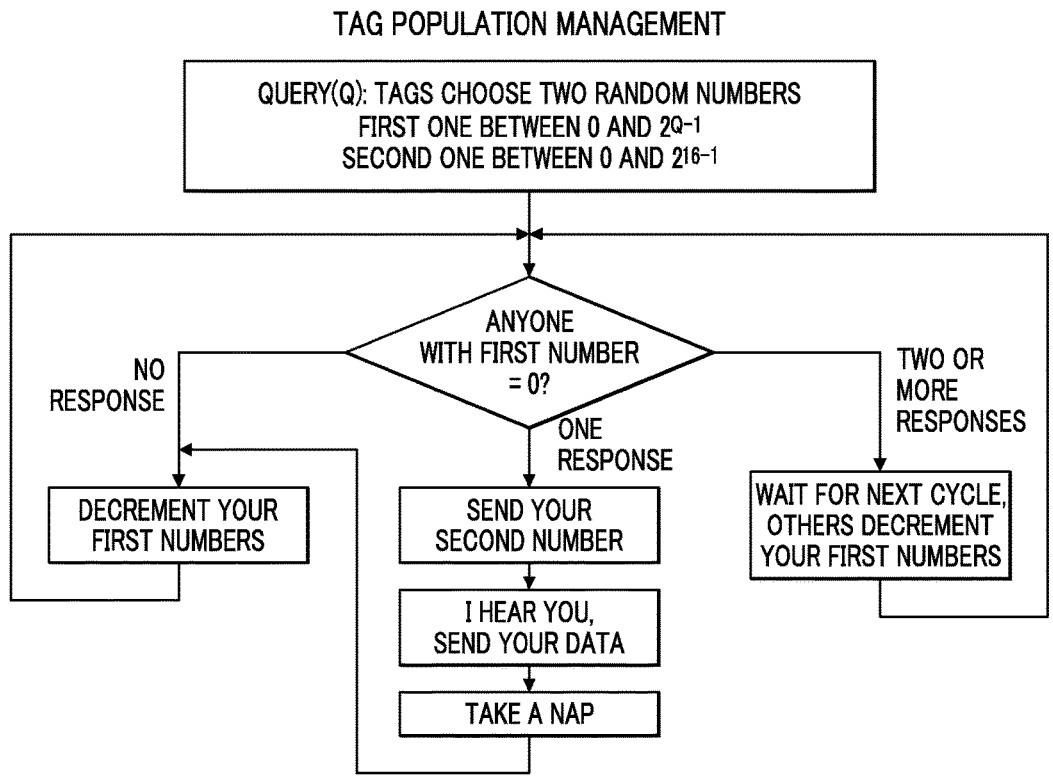
FIG. 1 is a flowchart of the prior art Q-algorithm.
Figure 2:
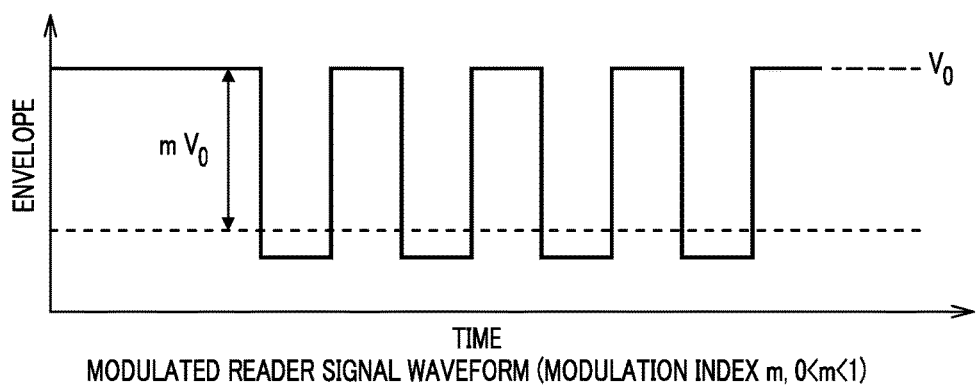
FIG. 2 is a graph of a modulated reader signal according to one embodiment.

Modulation depth m is defined as the modulation amplitude divided by the carrier signal amplitude, expressed as a percentage. The modulation amplitude is the peak (positive or negative) change in the RF amplitude from its unmodulated value. Therefore, a modulation depth m=100% indicates a signal wave envelope that varies between zero and twice the normal amplitude of the carrier signal. A modulation depth of m=50% a signal wave envelope that varies between 50% and 100% of the normal amplitude of the carrier signal. A modulation depth of m=0% would indicate that no signal wave is being transmitted. FIG. 2 shows the voltage $V_0$ of a combined wave envelope over time for a modulated signal having a modulation index 0<m<1 (i.e. a modulation depth of 0%<m<100%).

Each RFID tag has individual properties of antenna-chip impedance matching (resulting from manufacturing tolerances and discrepancies between individual integrated circuits (ICs), antennas, packaging, etc. . . . ) and specific parameters of the charge pump and demodulator circuitry. Therefore, each RFID tag has its own threshold minimum modulation depth $m_0$ for the received reader signal needed in order to successfully decode the command and respond. When the modulation depth m of the signal is smaller than this threshold value (m<$m_0$), the tag IC does not respond because it treats the demodulated signal with very low modulation depth as simply noise or as an invalid signal. However, the RFID tag continues to receive the carrier wave and remains powered on. In other words, minimum required modulation depth $m_0$ is a physical characteristic unique to each tag, and each RFID tag will not respond to any signal having a modulation depth lower than its unique $m_0$.

Because minimum required modulation depth $m_0$ is a physical characteristic unique to each tag, modulation depth can be used by the RFID reader to differentiate tags. Moreover, specific makes and models of tags have $m_0$ values that are in many cases similar to other units of that same make and model. This means that a system may contain variety of makes and models and address subgroups of tags based on their make and model.

Table 1 includes data for a list of exemplary RFID tags of different makes and models with different integrated circuit models. Table 1 shows the sensitivity and minimum modulation depth $m_0$ for each RFID tag.

TABLE 1

| Tag Make | Tag Model | IC Model | Tag Sensitivity | $m_o$ |
|---|---|---|---|---|
| A | w | 1 | −12.3 dBm | 39% |
| B | x | 1 | −12.9 dBm | 43% |
| C | y | 1 | −12.2 dBm | 54% |
| A | z | 2 | −15.8 dBm | 48% |

In this example, all of the tags shown in Table 1 are within range of the RFID reader. The reader transmits a command with Q=0 (instructing all tags to respond) but with the modulation depth m=40%. Only the tag Aw (Make A, model w) will respond to it, because m is lower than the $m_0$ values for all of the other tags. Increasing the modulation depth to 45% (and using exactly the same command) will cause the tag Bx to respond. As m is increased, more tags will respond until an m value of at least 54% is used ($m_0$ of tag Cy with the highest $m_0$), at which point all of the tags will respond. This allows the reader to exclusively address sub-groups of tags as shown in FIG. 3.

Figure 3:
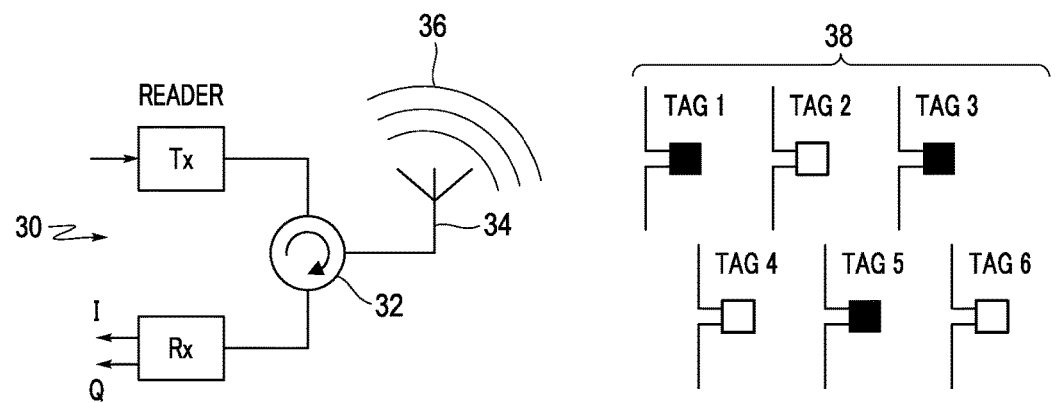
FIG. 3 is a diagram of a system according to one embodiment.

FIG. 3 shows a system according to one embodiment. The system includes an RFID reader 30, which includes transmitter Tx, circulator 32, antenna 34, and receiver Rx. RFID reader 30 transmits signal 36 wirelessly to RFID tags 38 that are within range. In this embodiment, RFID reader 30 transmits a first signal at 30% modulation depth, which causes shaded tags 1, 3, and 5 to respond. RFID reader 30 can address tags 1, 3, and 5 at a 30% modulation depth, because tags 1, 3, and 5 have a minimum modulation depth ($m_0$) of less than or equal to 30%. Unshaded tags 2, 4, and 6 have an $m_0$ of greater than 30%, and will ignore the first signal because its modulation depth is too low. RFID reader 30 sends a second signal at a modulation depth of 70%. Since tags 1-6 all have an $m_0$ of less than or equal to 70%, all tags 38 (including tags 2, 4, and 6) respond to the second signal. In this way, reader 30 can address different subgroups of tags 38. In some embodiments, calibration tags 38 that have known minimum modulation depths are included in tag population to improve identification accuracy.

Figure 7:
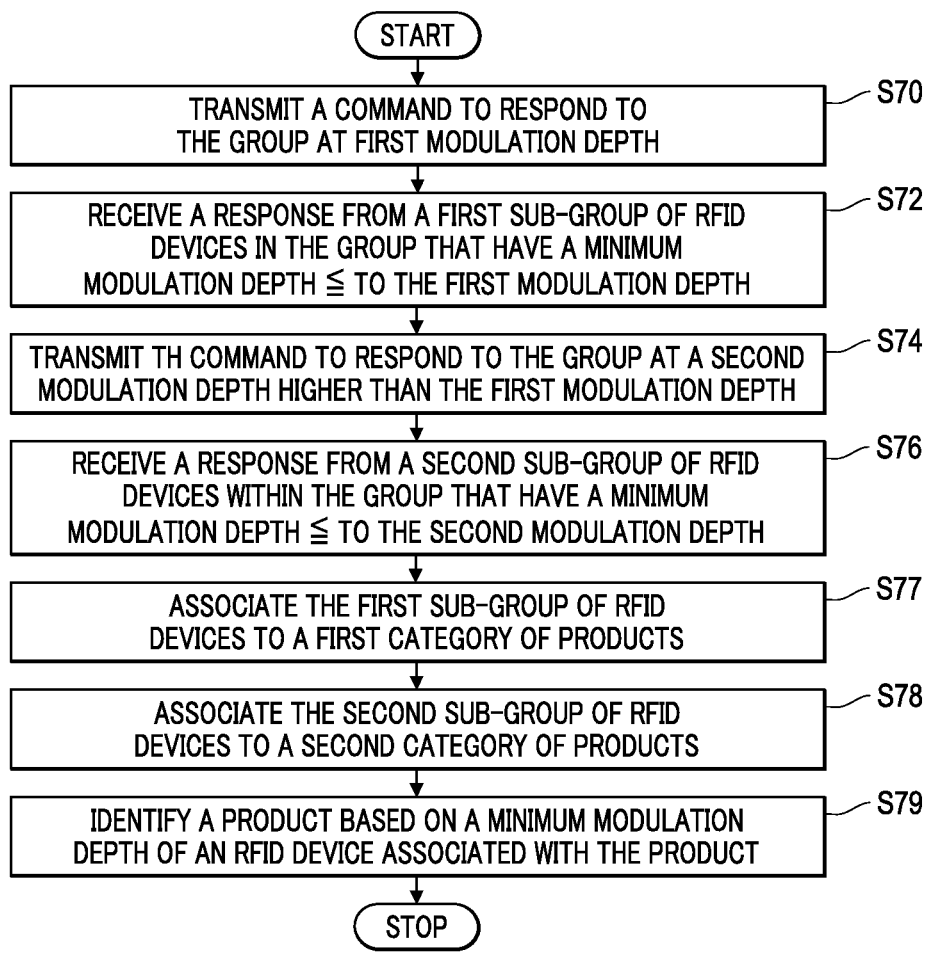
FIG. 7 is a flowchart of a method according to one embodiment.

FIG. 7 shows a flowchart of a method of addressing one or more RFID devices within a group of RFID devices. Step S70 includes transmitting a command to respond to the group at a first modulation depth. Step S72 includes receiving a response from a first sub-group of RFID devices in the group that have a minimum modulation depth less than or equal to the first modulation depth. Step S74 includes transmitting the command to respond to the group at a second modulation depth higher than the first modulation depth. Step S76 includes receiving a response from a second sub-group of RFID devices within the group that have a minimum modulation depth less than or equal to the second modulation depth. Step S77 includes associating the first sub-group of RFID devices with a first category of products. Step S78 includes associating the second sub-group of RFID devices with a second category of products. Step S79 includes identifying a product based on a minimum modulation depth of an RFID device associated with the product.

Figure 8:
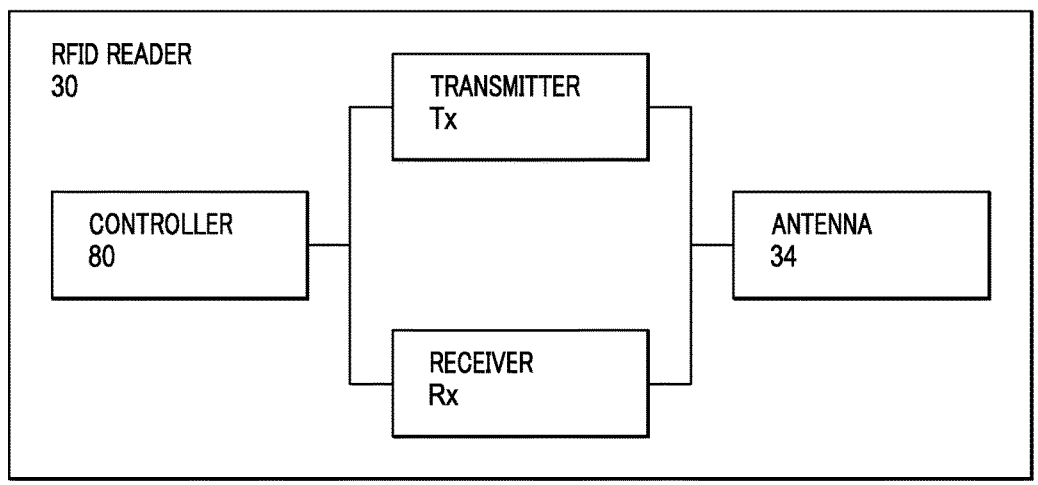
FIG. 8 is a block diagram of an RFID reader according to one embodiment.

FIG. 8 shows an RFID reader 30 according to one embodiment. In this embodiment reader 30 comprises controller 80 that controls the signals 36 that are transmitted from reader 30 using transmitter Tx. Controller 80 sets the modulation depth m of each signal transmitted from reader 30. Controller 80 can thereby address specific sub-groups of tags 38 based on modulation depth m, as described herein. Controller 80 also receives communications from tags 38 via receiver Rx. Controller 80 can modulate transmitted signals and demodulate received signals. In some embodiments, controller 80 uses amplitude modulation. In some embodiments, controller 80 also singulates groups of RFID tags using the Q-algorithm. Controller 80 may be a computer, ASIC, microcontroller, or other device capable of performing the tasks described herein. Controller 80 may include a CPU, RAM, ROM, storage media, signal processors, A/D converters, D/A converters, or any other necessary hardware components.

Figure 5:
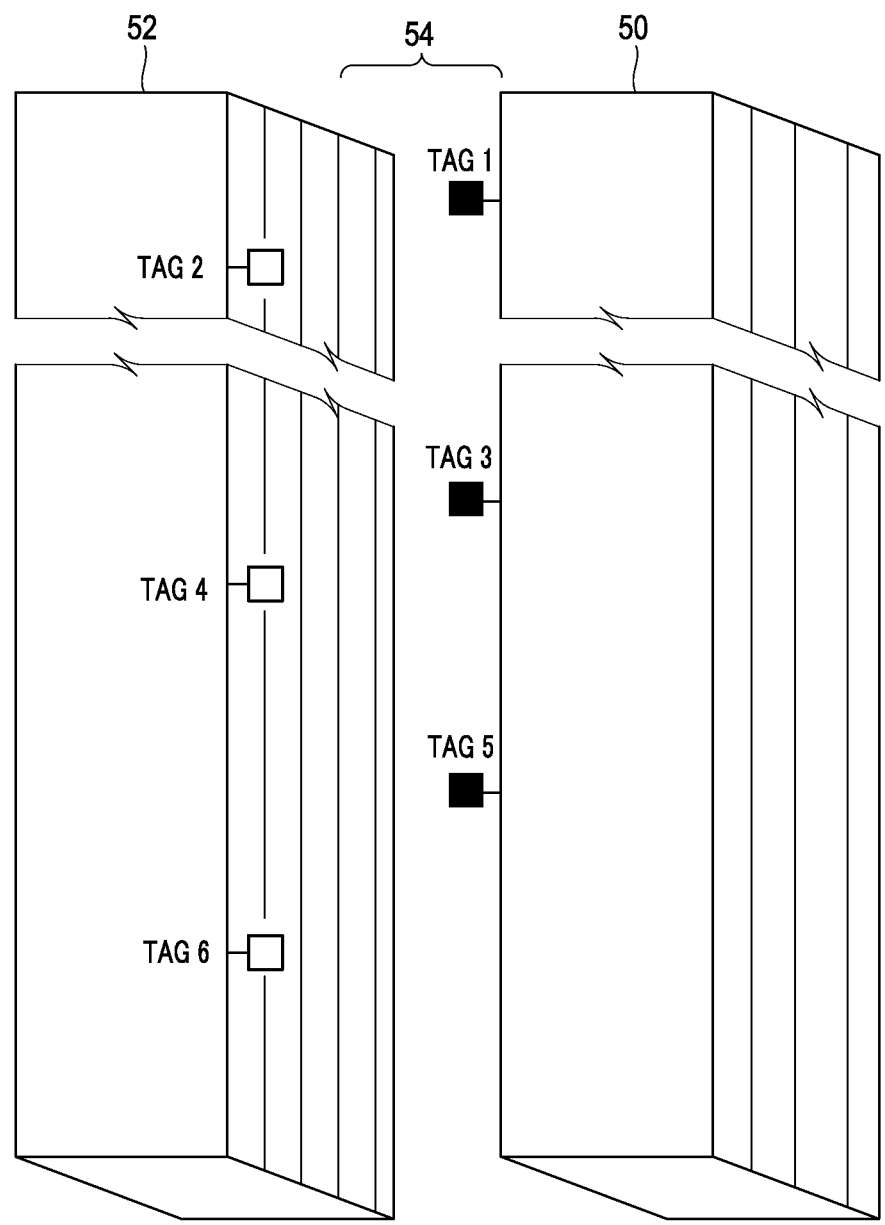
FIG. 5 is a system according to one embodiment installed in a work environment.

In FIG. 5, tags 1-6 from FIG. 3 have been installed on opposing shelve rows 50, 52 of a grocery store or warehouse aisle 54. Tags 2, 4, and 6 are installed on row 52, and tags 1, 3, and 5 are installed on row 50. In various embodiments, tags 1-6 are installed in specific locations on rows 50 and 52 or are installed on individual product packages. Because tags 1, 3, and 5 and 2, 4, and 6 respond as groups to different signal modulation depths, they can be addressed separately. Therefore, if an operator desires to scan, track, or locate products in a specific row 50, 52, it is possible to do so by varying signal modulation depth as described herein. The locations of operators within a facility can also be tracked based on which RFIDs are in their vicinity.

Figure 4:
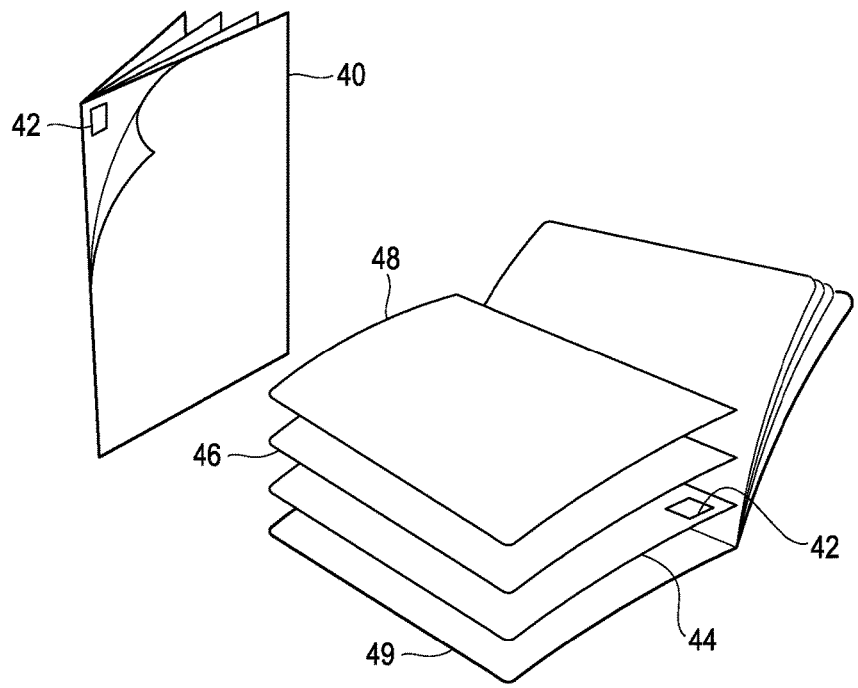
FIG. 4 is an exploded view and an angled isometric view of a tag according to one embodiment installed in a personal identification.
Figure 6:
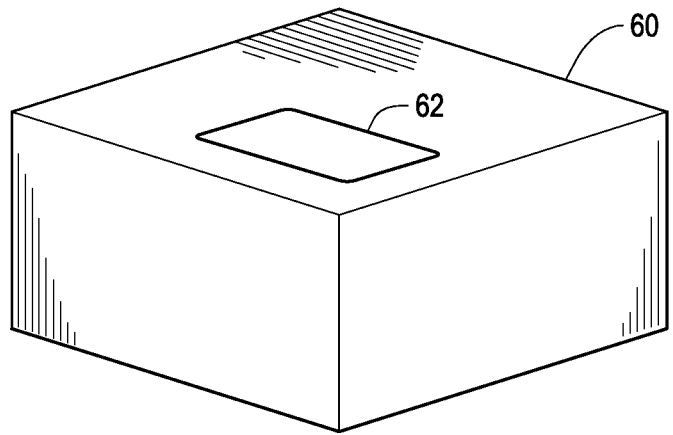
FIG. 6 is an angled isometric view of a tag according to one embodiment installed on a box.

FIGS. 4 and 6 show RFID tags integrated into physical identifications. In FIG. 4, an RFID tag is integrated into a passport 40. RFID tag is included on RFID tag layer 44, which includes an antenna, and a contactless module 42 comprising an integrated circuit. Passport 40 also includes the photo ID layer 46, cover 49, and protective layer 48. If any of these layers are altered or tampered with, the $m_0$ of the RFID tag in passport 44 will change. RFID reader 30 will either detect this change or fail to communicate with the RFID tag at all once the $m_0$ is changed from its original value. This change in $m_0$ occurs because tampering disturbs the antenna/packaging impedance matching and other characteristics of the RFID circuitry. Therefore, reader 30 can determine if the passport 40 (which has all correct ID and data) is truly authentic if the original $m_0$ for the passport 40 is known. This alteration of the $m_0$ will not be apparent to most counterfeiters, making it a hidden security feature.

In FIG. 6, an RFID tag is integrated into a box label 62 on box 60. RFID tags with different minimum modulation depths can be attached to different product packages and be used to identify different products or categories of products. If label 62 is tampered with (i.e. by removal and reapplication on another box), the $m_0$ will be altered. As with the photo ID example, RFID reader 30 will either detect this change or fail to communicate with the RFID tag at all once the $m_0$ is changed from its original value. This alteration of the $m_0$ will not be apparent to most smugglers or thieves, making it a hidden security feature.

According to one embodiment, an RFID identification 40, 62 can be authenticated by incrementally increasing the modulation depth of the signal, starting at value known to be lower than the $m_0$ of all RFID tags. The modulation depth of the first signal at which reader 30 receives a response will be the measured minimum modulation depth. Once communication is established, identification information is obtained from the RFID tag. This identification information is used to look up a known minimum modulation depth of the RFID identification. If the known minimum modulation depth differs sufficiently from the measured minimum modulation depth, this is evidence of tampering or counterfeiting and can be used as a basis for rejecting the RFID identification.

Figure 9:
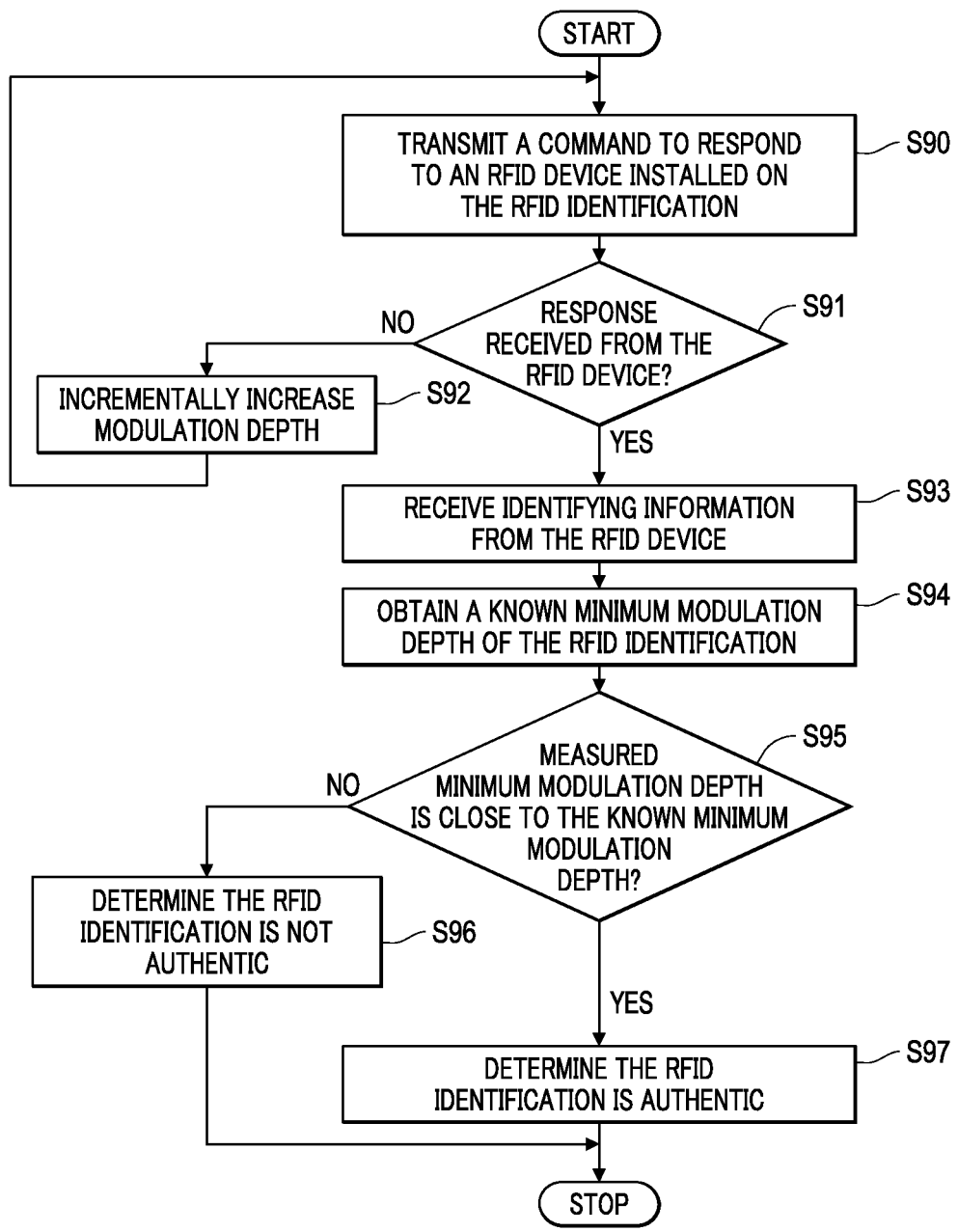
FIG. 9 is a flowchart of a method according to one embodiment.

FIG. 9 shows a method of authenticating an RFID identification. Step S90 includes transmitting a command to respond to an RFID device installed on the RFID identification. Step S91 includes determining if a response is received from the RFID device. Step S92 includes incrementally increasing the modulation depth if no response is received from the RFID device. Steps S90-S92 are repeated until a response is received from the RFID device in Step S91. The measured minimum modulation depth is the modulation depth at which a response is first received from the RFID device. Step S93 includes receiving identifying information from the RFID device if a response is received from the RFID device. Step S94 includes obtaining a known minimum modulation depth of the RFID identification using the identifying information. Step S95 includes comparing the measured minimum modulation depth to the known minimum modulation depth to determine if the measured minimum modulation depth is sufficiently close to the known minimum modulation depth. Step S96 includes determining that the RFID identification is not authentic if the measured minimum modulation depth is not sufficiently close to the known minimum modulation depth. Step S97 includes determining that the RFID identification is authentic if the measured minimum modulation depth is sufficiently close to the known minimum modulation depth.

The systems and methods described herein have several advantageous features. First, they provide the ability to address subgroups of tags directly without full singulation of their EPC IDs. After this is completed, tags can be singulated using other methods, but in smaller groups. This results in faster singulation and faster tag read rate. Second, the methods result in physically tamper-resistant authentication. Third, they provide the ability to address and maintain subgroups of tags indefinitely. In current Gen2 protocol, group markers (called persistence flags) expire in several minutes and reset to defaults due to discharge of internal tag capacitors. The $m_0$ is a permanent identifying feature of each tag, which does not expire.

The methods described herein can be implemented in current RFID readers. The methods described herein can also be used for RFID systems have a low carrier frequency (30 KHz to 300 KHz), high carrier frequency (3 to 30 MHz), and ultra-high carrier frequency (300 MHz to 3 GHz).

Although the invention has been described with reference to embodiments herein, those embodiments do not limit the scope of the invention. Modifications to those embodiments or different embodiments may fall within the scope of the invention.

What is claimed is:

1. A method of addressing one or more RFID devices within a group of RFID devices, comprising:
    transmitting, to the group of RFID devices at a first modulation depth, a first command to respond;
    receiving a response to the first command from a first sub-group of RFID devices in the group that have a minimum modulation depth less than or equal to the first modulation depth;
    transmitting, to the group at a second modulation depth higher than the first modulation depth, a second command to respond;
    receiving a response to the second command from a second sub-group of RFID devices within the group that have a minimum modulation depth less than or equal to the second modulation depth; and
    identifying the second sub-group of RFID devices from the first sub-group of RFID devices based on the second sub-group of RFID devices not responding to the first command sent but responding to the second command.

2. The method of claim 1, further comprising:
    performing singulation on the first sub-group.

3. The method of claim 2, wherein the singulation is performed using the Q-algorithm.

4. The method of claim 1, further comprising:
    associating the first sub-group of RFID devices with a first category of products; and
    associating the second sub-group of RFID devices with a second category of products.

5. The method of claim 4, further comprising:
    identifying a product based on a minimum modulation depth of an RFID device associated with the product.

6. The method of claim 1, further comprising:
    placing one of the first sub-group of RFID devices in a first location;
    placing one of the second sub-group of RFID devices in a second location; and
    identifying the first or second location based on a minimum modulation depth of the RFID device at that location.

7. An RFID system, comprising:
    a transmitter that transmits signals to a first group of RFID devices and a second group of RFID devices, the first group of RFID devices having a first minimum modulation depth, and the second group of RFID devices having a second minimum modulation depth higher than the first minimum modulation depth; and
    a controller that uses the transmitter to send a first signal to the first and second groups of RFID devices at a first modulation depth, and send a second signal to the first and second groups of RFID devices at a second modulation depth,
    wherein the first modulation depth being greater than or equal to the first minimum modulation depth and less than the second minimum modulation depth,
    wherein the second modulation depth being greater than or equal to the second minimum modulation depth,
    wherein the first group of RFID devices responding to the first and second signals, and
    wherein the second group of RFID devices responding to the second signal and not responding to the first signal.

8. The system of claim 7, wherein the controller singulates the first group of RFID devices.

9. The system of claim 8, wherein the controller uses the Q-algorithm to singulate the first group of RFID devices.

10. The system of claim 7, wherein the RFID system further includes:
    a receiver that receives signals from the RFID devices.

11. The system of claim 10, wherein the controller demodulates signals received with the receiver.

12. The system of claim 7, wherein the signals are amplitude modulated.

13. The system of claim 7, further comprising:
    an RFID device having a minimum modulation depth that is stored in the controller.

14. The system of claim 7, wherein the minimum modulation depth of at least one of the groups of RFID devices is between 39% and 54%.

15. The system of claim 7, wherein the signals have a carrier frequency between 30 and 300 KHz.

16. The system of claim 7, wherein the signals have a carrier frequency between 3 and 30 MHz.

17. The system of claim 7, wherein the signals have a carrier frequency between 300 MHz and 3 GHz.

18. A method of authenticating an RFID identification, comprising:
    transmitting, at a first modulation depth, a first signal comprising a command to respond to an RFID device installed on the RFID identification;
    determining if a response is received from the RFID device;
    transmitting a second signal comprising a command to respond to the RFID device at a higher modulation depth;
    receiving identifying information from the RFID device;
    obtaining a known minimum modulation depth of the RFID identification using the identifying information;
    comparing a measured minimum modulation depth of the RFID identification to the known minimum modulation depth; and
    determining that the RFID identification is not authentic if the measured minimum modulation depth varies more than a predetermined amount from the known minimum modulation depth.

19. The method of claim 18, wherein the first modulation depth is a value known to be lower than the minimum modulation depth of all RFID identifications.

20. The method of claim 18, wherein the RFID identification is a personal photograph identification.

* * * * *